United States Patent
Carrillo et al.

(10) Patent No.: US 8,254,375 B2
(45) Date of Patent: Aug. 28, 2012

(54) METHOD, TERMINAL, AND ADDRESS SERVER FOR CONFIGURING A TERMINAL

(75) Inventors: Luis Carrillo, Bocholt (DE); Anton Kruk, Hamminkeln (DE)

(73) Assignee: Gigaset Communications, GmbH, Munich (DE)

( * ) Notice: Subject to any disclaimer, the term of this patent is extended or adjusted under 35 U.S.C. 154(b) by 135 days.

(21) Appl. No.: 12/531,539

(22) PCT Filed: Mar. 16, 2007

(86) PCT No.: PCT/EP2007/002326
§ 371 (c)(1),
(2), (4) Date: Jan. 4, 2010

(87) PCT Pub. No.: WO2008/113370
PCT Pub. Date: Sep. 25, 2008

(65) Prior Publication Data
US 2010/0103843 A1    Apr. 29, 2010

(51) Int. Cl.
*H04L 12/66* (2006.01)
(52) U.S. Cl. ........ 370/352; 370/392; 370/401; 370/254; 709/220
(58) Field of Classification Search .................. None
See application file for complete search history.

(56) References Cited

U.S. PATENT DOCUMENTS 6,909,987 B2 * 6/2005 Jung .............................. 702/176
2004/0133689 A1 * 7/2004 Vasisht ......................... 709/228
2005/0153683 A1   7/2005 Gustafsson

FOREIGN PATENT DOCUMENTS
WO    WO 2004/091173    10/2004

OTHER PUBLICATIONS

Petrie, "A Framework for SIP User Agent Configuration", Internet Engineering Task Force, IETF, Ch No. 1, p. 3-6, Nov. 2001.

* cited by examiner

*Primary Examiner* — Duc C Ho
(74) *Attorney, Agent, or Firm* — Kauth, Pomeroy, Peck & Bailey LLP

(57) ABSTRACT

A method for configuring a terminal, wherein a user first enters an authentication code provided by a provider into the terminal, the authentication code is then transmitted from the terminal to an address server, which then provides an address of a configuration server using the authentication code and transmits the address to the terminal, and the authentication code is then transmitted to the configuration server, and subsequently the configuration sever provides the configuration data with reference to the transmitted data, and the configuration data is transmitted to the terminal and is configured there. A terminal and an address server are also provided.

13 Claims, 3 Drawing Sheets

METHOD, TERMINAL, AND ADDRESS SERVER FOR CONFIGURING A TERMINAL

CROSS-REFERENCE TO RELATED APPLICATIONS

This application is a §371 national stage entry of International Application No. PCT/EP2007/002326, filed Mar. 16, 2007, which is hereby incorporated by reference in its entirety.

BACKGROUND

1. Field of the Invention

The invention relates to a procedure for configuring a terminal with user and/or provider-related configuration data, a terminal for a communication device in a packet-mediated network and an address server for a packet-mediated communication network.

2. Background of the Invention

Modern digital terminals often must be equipped with configuration data (configured) before they are first used in a communication network, to assure usage in this communication network commensurate with the purpose. In "classical" conductor-mediated communication networks a terminal was at least basically ready to operate immediately after attachment to a "port" of a communication device or of a public communication system, with no previous configuring; but especially wireless, radio-based ones or those operated in packet-mediated fashion (so-called VoIP terminals; VoIP=Voice-over Internet Protocol) of necessity must be provided with configuration data, which, for one thing, permit identification of the user (N1, N2), and for another, indicate those network nodes via which communication connections are to be carried out, in the case of a GSM mobile telephone (cell phone), these configuration data are entered into the terminal, by putting a so-called SIM card (SIM—subscriber identification module) into the device. On this SIM card the configuration data are then stored which are used by the terminal for contacting a mobile radio base station of the assigned provider.

Also wireless phones, for example DECT terminals (DECT=digital enhanced cordless telephony) must identify themselves to a DECT base station to obtain access to communication connections and network services, if the devices have not been logically connected with each other by the manufacturer, the user (N1, N2) must pair them, for example by inputting of a station code into the terminal.

Also in VoIP terminals, and thus in internet telephony, a terminal, regardless of whether it is a concrete IP phone or appropriately set-up computer hardware, must be provided with configuration data. Thus, for example, the network nodes of a provider, thus for example an H.323 gatekeeper or an SIP proxy server, along with its network address, must be configured in the terminal so that a communication connection can be created. Additionally, in the device a user name and a password must be stored (administered), so that the assigned user can be identified by the network node device. Depending on the communication protocol used, it is precisely in the last-named example that still more "technical data" must be inputted into the terminal, for example regarding the language codes to be used, addresses of address list servers such as the DNS server, directory server, etc.

With use of such digital terminals, it has been shown to be disadvantageous that precisely in those cases in which a technical layman would like to place such a terminal in use, that configuration with correct data is often a nuisance and encumbered by errors.

To get around these disadvantages, many network operators (providers) make available already pre-configured terminals to their customers, which are placed into operation by the customer by simply connecting to their data network, such as a DSL modem or router and by providing a power supply. Great logistical expense, however, is connected with making available such client-specific, pre-configured devices. For this reason, solutions have also become established in which terminals can be made available to the customer that are already pre-adjusted to a specific provider, i.e., that in these devices, the configuration data that are generally valid for the specific provider have been pre-set. In these instances, the customer then inputs a user name and a user identification, and if necessary a password such as a PIN that the provider has made available to him, after which, according to the pre-set configuration data, the terminal creates a connection to a server of the provider and registers itself and the user.

Although the above-named procedure offers a high lever of utilization comfort, it is encumbered with a disadvantage in that a manufacturer of digital terminals who supplies different providers, has to provide a separate version of the terminal for each of these providers, in which the particular valid basic configuration data of the particular provider are already set. In addition, with such a procedure, it must be ensured that at the time the terminal is purchased or placed in operation, the previously pre-set basic configuration data are still current and complete.

SUMMARY OF THE INVENTION

Thus, one task of the present invention is to propose a reliable, logically simple and customer-friendly procedure and such devices (terminals, servers) for configuring of terminals.

This problem is solved by a procedure for configuring a terminal with user- and/or provider-related configuration data, a terminal for a communication device in a Packet-mediated network and an address server for a packet-mediated communication network in accordance with the current invention.

To solve the problem, a procedure is suggested for configuring a terminal in which an authentication code made available to the user by his provider is first entered into the terminal for configuring the user- and/or—provider-related configuration data. The authentication code is configured in such a way that from it a conclusion can be made regarding the provider that has generated or made available this authentication code. This information is used by the terminal to contact a configuration server of the provider, with the authentication code or at least a portion of the authentication code that identifies the user being transferred to this configuration server, with the server then, using the received data, making the configuration data available and transmitting to the terminal, after which the terminal configures itself using these configuration data. By using such a procedure for putting his new terminal into operation, all a customer need do is to input the authentication code which his provider made available. Since the actual configuration data are only loaded by the configuration server at the start of operation, the terminal is always supplied with constantly current configuration data, so that even after the period when the terminal is produced, these data can be altered, even on the network side.

The solution of the problem further makes provision for use of a terminal (EG1, EG2) (shown schematically in FIG. 2)

for a communication device in a packet-mediated network, with the terminal installed so that first it indicates a user (UI) interface for inputting an authentication code. Additionally, the terminal has a transmitter (1) for transmitting at least a part of the authentication code to an address server, and a receiver (2) to receive an address of a configuration server from the address server. Additionally, the terminal comprises an additional, or the same, transmitter (3) for transmitting the authentication code or at least a part of the authentication code that identifies the user, to the configuration server; a receiver (4) for receiving configuration data made available by the configuration server; and a device (5) for using configuration data on the terminal. Such a terminal can be manufactured "in stockpiled fashion" in a mass-production process, because only the (one) address of the address server needs to be pre-configured by the manufacturer in this terminal. Even if, after the date of manufacture, a new, additional provider incorporates this terminal into its product line, not all already-manufactured terminals need to be re-configured; rather, it suffices to insert an additional provider-related entry into an assignment table of the address server. For this it is sufficient if such an entry includes a connection between a provider identification for an authentication code and a network address (URL) of a configuration server of the provider.

Additionally, the solution of the problem makes provision for use of an address server (AS) (shown schematically in FIG. 3) for a packetmediated communication network, which is set up for exchanging data (via a receiver 8 and transmitter 9) with a terminal (shown in FIG. 2) and includes an access device (7) for a data base, with the access device set up together with the data base for identification of a provider using the received authentication code or using a part of the authentication code (8), and for determining the address of a configuration server of the determined provider, with this address being able to be made available to the requesting terminal (9). In a simple embodiment form, the data base is a component part of the address server. By use of such an address server, a terminal obtains access to whatever number of configuration servers of a wide variety of providers, without the network addresses of these (numerous) configuration servers needing to be administered beforehand in the terminal. A further advantage consists in a user avoiding erroneously trying with one server to register with an undesired provider, because through the authentication code, the address server is placed into a position to pre-set one (or more) suitable configuration servers.

Advantageous embodiments of the procedure are given in the further embodiments disclosed herein. The features and advantages described with them also are valid mutatis mutandis for the invention-specific terminal and the invention-specific address server.

Therefore, for the procedure, it is essential if, in the second step, for identification of the address by the terminal, at least a part of the authentication code is transmitted to an address server, after which, via the address server, one or the address of the configuration server is made available and transmitted to the terminal. By this means it is ensured that at the time of the registration (configuration), the terminal is using the current network address of a configuration server of the correct provider. Naturally, a provider can also operate multiple configuration servers, and conversely, multiple providers can use a common configuration server.

A simple assessment of the authentication code is possible, if for identification of the provider, places reserved for this are used in the authentication code or an abbreviation of the provider name.

It is possible even for technical laymen to operate it, if in the first step, via the terminal, using a user interface, an input request is issued for input of the authentication code. Especially in those cases in which no configuration data are yet present in the terminal, or communication using the present configuration data is not, or is no longer, possible, it is advantageous if the input request is issued automatically.

The procedure is run with particular advantage in a packet-mediated network, for example an intranet or in the internet, in such cases a URL is used in practice as the address of the configuration server.

In the second step, via the address server, additional configuration data (additional configuration data) can also be sent to the terminal and used for further configuration of the terminal, with the additional configuration data, for example a firmware update, an additional program and/or customer information, able to be transmitted to the terminal.

For security reasons, when the procedure is being carried out, or during an interruption of configuration data, the terminal can issue an input request for inputting a PIN or a code word, with this PIN or code word being sent to the configuration server in a third step as a confirmation of entitlement to retrieve configuration data. Alternatively, input of a correct PIN or of a correct password may also be the prerequisite for already received configuration data being used on the terminal. Such a PIN or password can be provided to a customer separately from the authentication code for security reasons. However, the PIN can also be integrated into the authentication code so as to be able to dispense with separate provision and input of a PIN.

In advantageous fashion, when retrieving the configuration data, the terminal transmits information about its own hardware and/or software configuration and/or position information to the configuration server, so that configuration data, adapted to the particular terminal, is made available and can be used on the terminal. Such hardware and/or software information or position information, can also be transmitted from the terminal to the address server, in order to request from it specific additional configuration data (additional configuration data).

The configuration data, and, if necessary the additional configuration data, are at least partially used advantageously for configuring the terminal for a voice-over-IP communication device.

BRIEF DESCRIPTION OF THE DRAWINGS

An embodiment example of the invention-specific procedure will be explained in what follows using the drawing. This simultaneously serves to explain the invention-specific terminal and an invention-specific address server.

With this.

DETAILED DESCRIPTION OF THE INVENTION

Figure 1:
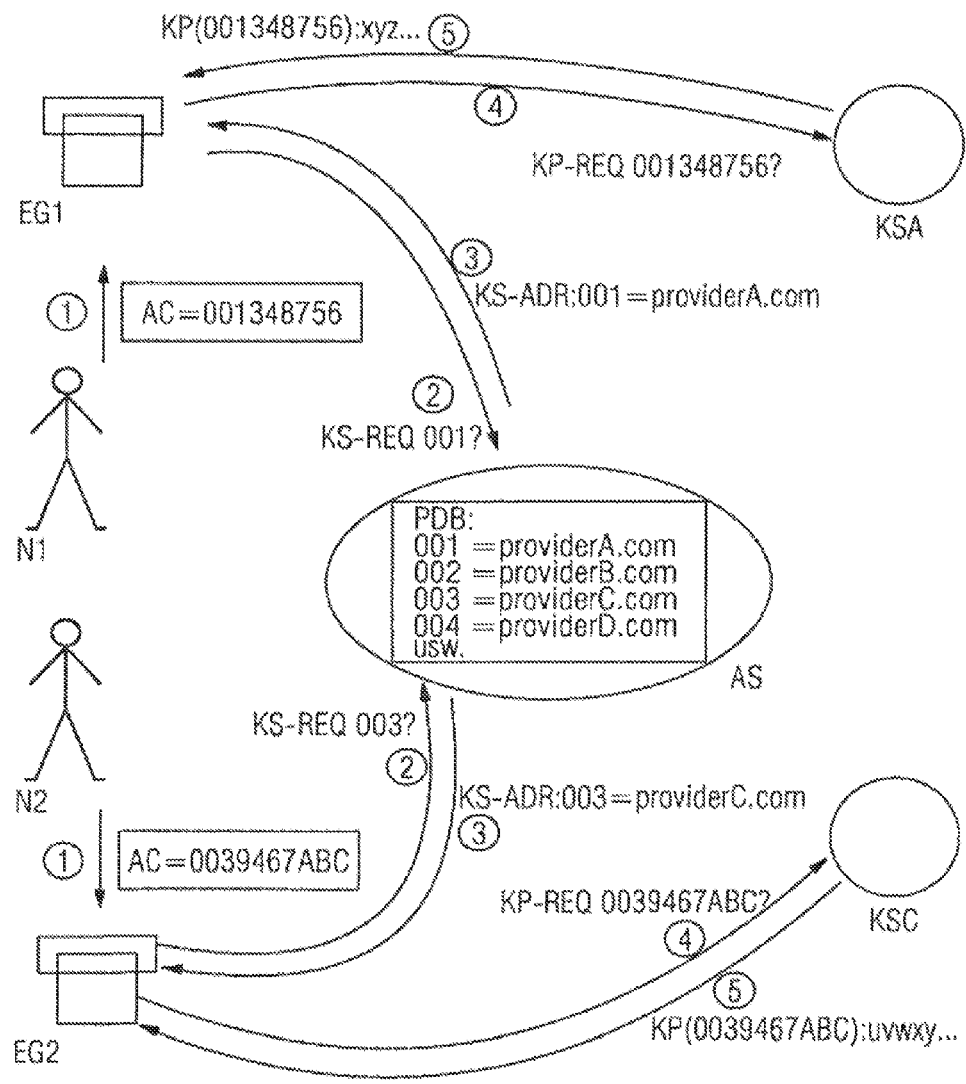
FIG. 1 is a schematic depiction of an arrangement of two users, two terminals, two configuration servers and an address server, with the data exchange in individual procedural steps visualized with the aid of arrows.
Figure 2:
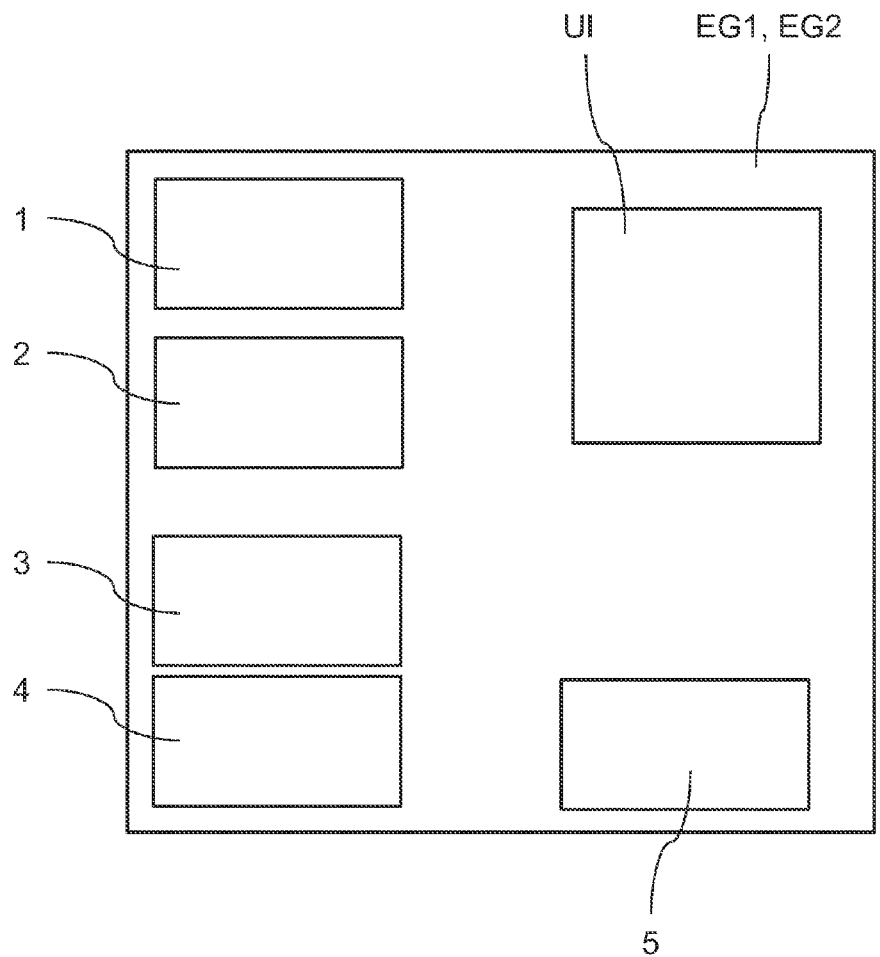
FIG. 2 is a schematic depiction of another embodiment of the invention.
Figure 3:
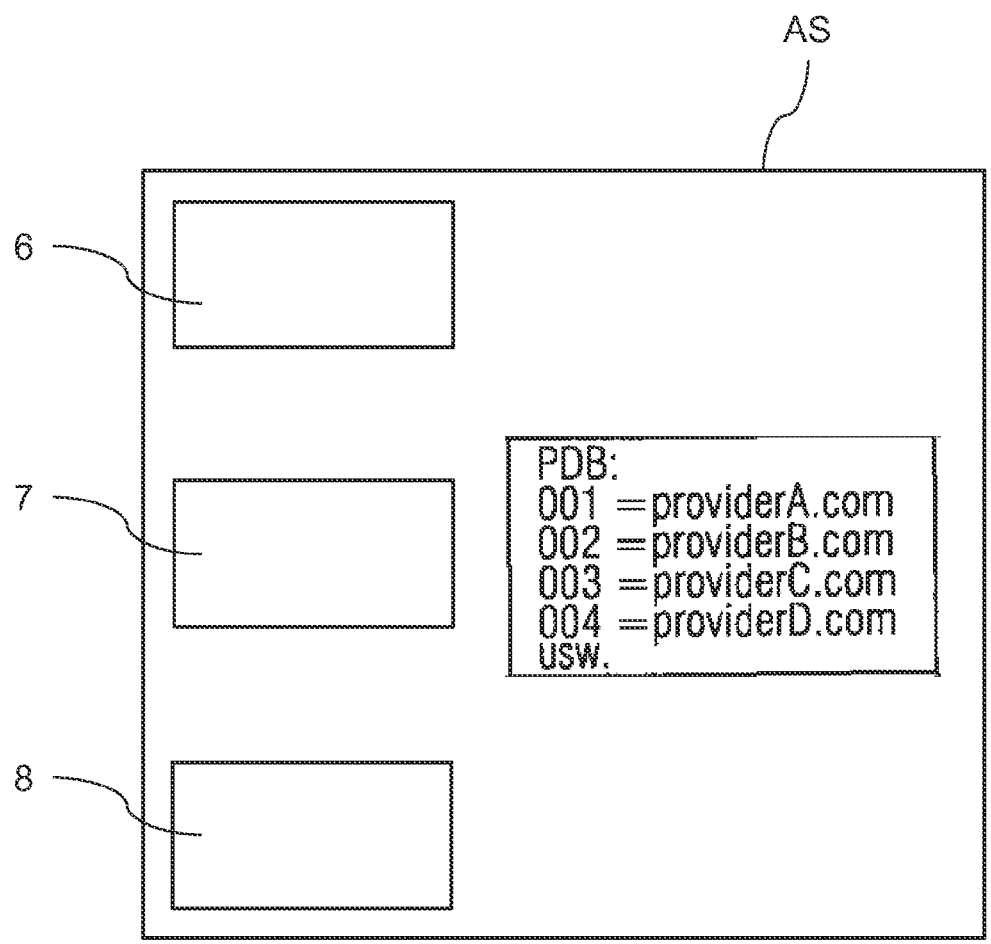
FIG. 3 is another schematic depiction of another embodiment of the invention.

The FIGURE schematically shows two terminals EG1, EG2, with their pertinent users N1, N2. The terminals EG1, EG2 are VoIP telephones that are connected via a data network (not shown), for example a wireless Wlan network, with a public communication network (here: the internet). Understandably, the procedure described here is not limited to such terminals. Additionally, in the FIGURE, two configuration servers KSA, KSC are depicted of providers "providerA," "providerC," as well as an address server AS. Between depicted terminals EG1, EG2 and the servers KSA, RSC, AS shown, arrows are drawn in which are to visualize an information flow and which are designated with numbers between 1 and 5. The numbers between 1 and 5 provide a sequence of the information flow in ascending sequence. In what follows, the invention-specific procedure is described for two different users N1, N2, and thus for two different terminals EG1, EG2, with the arrows provided with an identical designation (numbers between 1 and 5) for each of the equivalent procedural steps or information transmissions.

Before the start of the placement-in-operation procedure, user N1 receives a personal authentication code and a "secret number" (a so-called PIN) from a provider with whom he has entered into a service contract for provision of telecommunication services. At the same time, user N1 obtains a telephone, namely terminal EG1, and connects it to his communication network, which here is his DSL router. When it initiates ("boots"), terminal EG1 determines that it is in the as-delivered state and therefore shows on the display a request to input an authentication code and a PIN; optionally, entry of the PIN can be dispensed with.

Via the network, and thus via the Internet, terminal EG1 now creates a connection to address server AS. The network address (IP address or URL) of the address server has already been programmed into terminal EG1 by the manufacturer. In the present instance, address server AS is even operated by the manufacturer of terminal EG1, or made available. As part of this connection, terminal EG1 transmits a query message "KS-REQ001?" to address server AS, with the numerical sequence "001" being part of the authentication code "001348756" (to be more precise: the first three numbers).

Alternatively, additional information or the complete authentication code can be transmitted to address server AS with the query message. Additionally, it is also conceivable that the terminal requests location information from user N1 and additionally transmits this information to the address server.

The transmitted numerical sequence "001" is a numerical sequence agreed on between the provider and the operator of address server AS, which provides the message that the authentication code AC was made available by the provider "providerA." Using a data base, which is a component part of the address server AS in the present embodiment example, it obtains the information that the provider designated with the numerical sequence "001" operates a configuration server KSA, which has the network address (URL) "providerA.com." Address server AS transmits this information with a reply message "KS-ADR:001=providerA.com" to terminal EG1, where this information is placed in intermediate storage.

Terminal EG1 now generates an additional query message "KP-REQ001348756?" and transmits it to the previously determined URL, namely to the URL "providerA.com," through which this query message is transmitted to configuration server KSA, in configuration server KSA, in another data base, a determination is made of whether the authentication code "001348756" just received by means of the query message is valid, and thereafter determines which parameters are to be made available to user N1 with this authentication code AC. These data are now transmitted as a configuration record "KP(001348756): XYZ" to terminal EG1 and are there used on terminal EG1. In those instances in which user N1 at the start of the procedure had to enter a PIN into terminal EG1, this PIN can be transmitted either with the first query message to address server AS, or—more customarily—with the second query message, to configuration server KSA, with continuation of the procedure able to be made dependent on the correctness of the PIN in each case.

In the present embodiment example, terminal EG1 was now equipped with basic data for a successful VoIP communication, thus for example with address information of a suitable gateway, of an SIP proxy server or the like. Also, a user name and a user identification for use of these central devices (Gateway, proxy server) have been queried with the procedure from configuration server KSA.

In an alternative embodiment form, along with the URL, of the configuration server KSA, other additional information (additional configuration data) can be transmitted from address server AS to terminal EG1 and used there, such as a country-specific software version or country-specific settings for a case in which location information was sent with the query message "KS-REQ001." It is also conceivable that address server AS, using the provider identification or using the complete authentication code, makes available further information or advertising and transmits it to terminal EG1 for the purpose of dissemination (depiction).

In a second embodiment example, an additional user N2 enters its (other) authentication code "0039467ABC" into its new terminal EG2. Since the procedure in this embodiment example is the same as in the previous embodiment example, here only the differences are indicated. As is evident from the FIGURE, user N2 uses an authentication code of another provider "providerC.com," which also operates a separate configuration server KSC. One also can see that apart from the first three numbers of the authentication code, which in this example are reserved for the provider identification, every provider is totally free to decide how to configure the remaining positions in the authentication code; for example, only numbers, or mixed numbers and letters, cryptic data or clear text, etc. Naturally, multiple providers can also share one or more common configuration servers KSA, KSC; conversely, a single provider can make provision for multiple configuration servers KSA, KSC.

Prior to being put in service for the first time, terminals EG1, EG2 automatically issue a request for input of an authentication code AC. Understandably, such a request for an input can be issued manually, for example via a menu function, for example if a used terminal EG1, EG2 is acquired or if forced to reconfigure such a device.

In an additional embodiment example, each terminal EG1, EG2 also transmits its serial number such as IMEI=International Mobile Equipment Identification, to address server AS with the initial query message. Through this it is possible to register stolen terminals EG1, EG2 in the data base of address server AS, and if a subsequent attempt is made to configure, to block further operation of it through an appropriate reply message (instruction) or additional configuration data.

The invention claimed is:

1. Procedure for configuring a terminal, with user- and/or provider-related configuration data entered into the terminal, comprising:
    in a first step, by a user, an authentication code made available by a provider is entered into the terminal,
    in a second step, using at least a part of the authentication code assigned to the provider, an address of a configuration server of the provider is identified,
    in a third step, transmitted data comprising at least one part of the authentication code assigned to the user is transmitted to the configuration server, in a fourth step, via the configuration server, using the transmitted data, configuration data are made available and are transmitted to the terminal, and in a fifth step, the terminal is configured using the configuration data.

2. Procedure according to patent claim 1, wherein in the second step for identification of the address, via the terminal, at least a part of the authentication code is transmitted to an address server, after which the address server is prepared and transmitted to the terminal.

3. Procedure according to claim 2, wherein in the second step, via the address server, additional configuration data are sent to the terminal and used for further configuring of the terminal.

4. Procedure according to patent claim 3, wherein via the additional configuration data a firmware update, and additional program and/or customer information are transmitted to the terminal.

5. Procedure according to claim 1 wherein in the authentication code for an identification of the provider, positions reserved for this are used.

6. Procedure according to claim 1 wherein in the first step, via the terminal by means of a user interface, an input request is issued for inputting the authentication code.

7. Procedure according to claim 6, wherein in those instances in which no configuration data are yet present in the terminal, the input request is issued automatically.

8. Procedure according to claim 1, wherein a URL is used as the address.

9. Procedure according to claim 1, wherein via the terminal, before or during the retrieval of the configuration data an input request for inputting a PIN or a password is issued, with this PIN or the password, in the third step, being sent as a confirmation of entitlement to retrieve the configuration data to the configuration server.

10. Procedure according to claim 1, wherein the terminal is operated in a packet-mediated network.

11. Procedure according to claim 1, wherein at least the part of the configuration data for configuring a terminal is used for a voice-over IP device.

12. Terminal for a communication device in a packet-mediated network, with the terminal set up with a storage device for storage of configuration data for implementation of communication connections according to a communication protocol for packet-mediated networks, comprising:

a user interface for inputting of an authentication code, a transmitter for transmitting at least a part of the authentication code to an address server, a receiver for receiving an address of a configuration server from the address server, a transfer device for transferring the authentication code or at least a part of the authentication code identifying the user to the configuration server, a receiver for receipt of configuration data prepared by the configuration server, and a device for using the configuration data on the terminal.

13. Address server for a packet-mediated communication network, comprising:

a receiver for receipt of at least a part of an authentication code from a terminal, an access device for a data base, with the access device set up for identification of a provider using the received authentication code or using the part of the authentication code, and for retrieval of an address of a configuration server of a determined provider, and a transfer device for transferring the determined address to the terminal.

* * * * *